(12) United States Patent
Salmang et al.

(10) Patent No.: US 6,221,471 B1
(45) Date of Patent: Apr. 24, 2001

(54) RUBBER MODIFIED MONOVINYLIDENE AROMATIC POLYMER BLENDS

(75) Inventors: Rodolfo J. Salmang, Santafé de Bogotá (CO); John L. Sugden, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/148,083

(22) Filed: Sep. 4, 1998

Related U.S. Application Data

(60) Provisional application No. 60/063,851, filed on Oct. 31, 1997, and provisional application No. 60/087,088, filed on May 28, 1998.

(51) Int. Cl.[7] .......................... B23B 25/00; B23B 27/06; C08F 279/02; C08L 9/06; C08L 47/00

(52) U.S. Cl. ...................... 428/220; 428/327; 428/519; 428/521; 428/523; 428/910; 525/86; 525/316

(58) Field of Search .................... 525/86, 316; 428/35.7, 428/36.91, 220, 213, 500, 519, 520, 523, 337, 910, 521, 327

(56) References Cited

U.S. PATENT DOCUMENTS

| | | |
|---|---|---|
| 3,123,655 | 3/1964 | Ottling et al. .................. 264/211.21 |
| 3,144,420 | 8/1964 | Fryling et al. ........................ 525/193 |
| 3,346,520 | 10/1967 | Lee et al. ............... 526/206 |
| 3,639,522 | 2/1972 | Narayana et al. .................... 525/316 |
| 3,787,532 | 1/1974 | Carmelite et al. ...................... 525/68 |
| 3,976,608 | 8/1976 | Buckler et al. ........................ 524/13 |
| 4,101,050 | 7/1978 | Buckler et al. ..................... 428/35.7 |
| 4,111,349 | 9/1978 | Buckler et al. ..................... 428/35.7 |
| 4,409,369 | 10/1983 | Lyons et al. .......................... 525/314 |
| 4,428,106 | 1/1984 | Campbell et al. .............. 29/890.033 |
| 4,956,477 | 9/1990 | Thompson et al. .................... 524/474 |
| 5,151,309 * | 9/1992 | Dollinger ................................ 428/40 |
| 5,294,656 | 3/1994 | Okamoto et al. ..................... 524/269 |
| 5,334,658 | 8/1994 | Blumenstein et al. ................. 525/71 |
| 5,491,195 | 2/1996 | Schrader et al. ....................... 525/71 |
| 5,643,664 | 7/1997 | Kwong et al. ........................ 428/327 |

FOREIGN PATENT DOCUMENTS

| | | |
|---|---|---|
| 265142 | 10/1987 | (EP) . |
| 620236 | 4/1994 | (EP) . |
| 07324149 | 12/1995 | (JP) . |
| 07324150 | 12/1995 | (JP) . |
| 07324151 | 12/1995 | (JP) . |
| 07324152 | 12/1995 | (JP) . |
| 08127685 | 5/1996 | (JP) . |

OTHER PUBLICATIONS

Derwent 93–252904/32 (JP05170991).
Derwent 43602Y/25 (DL125136).
Derwent 91–224578/31 (EP–439160).
Derwent 96–200900/20 (WO 9610056).
Derwent 94–189015/23 (JP06128339).
Derwent 90–086454 (JP02038435).
Derwent 83–749718/35 (JP58122827).
Derwent 88–114270/17 (EP–265142).
Derwent Publications Ltd., 93–208923 & JP 05 132605.
Derwent Publications Ltd., 97–221050/20.
Encyclopedia of Polymer Science and Engineering, vol. 16, General Purpose Polystyrene, pp. 62–70, 1985.*

* cited by examiner

Primary Examiner—Paul Thibodeau
Assistant Examiner—Ramsey Zacharia

(57) ABSTRACT

The present invention is a blend of a monovinylidene aromatic polymer and a rubber modified monovinylidene aromatic polymer, which can be used to produce cost effective, transparent packaging that can be used in food packaging and non-food packaging markets, and can be produced using conventional thermoforming equipment. The blend comprises:

a) from 50 to 88 wt. percent based on the total weight of the blend, of a monovinylidene aromatic polymer having a weight average molecular weight (Mw) of from 265,000 to 400,000 and a melt flow of less than 2.5 g/10 min.; and b) from 12 to 50 wt. percent based on the total weight of the blend, of a rubber modified monovinylidene aromatic polymer comprising a monovinylidene aromatic polymer matrix having rubber particles dispersed therein, wherein the rubber particles comprise, based on the total weight of the rubber particles, from 25 to 100 weight percent rubber particles having a capsule morphology and a volume average particle size of from 0.1 to 0.4 microns; and from 75 to 0 weight percent rubber particles having an entanglement morphology having a volume average particle size of from 0.25 to 1 micron.

13 Claims, No Drawings

RUBBER MODIFIED MONOVINYLIDENE AROMATIC POLYMER BLENDS

CROSS-REFERENCE STATEMENT

This application claims the benefit of U.S. Provisional Application No. 60/063,851, filed Oct. 31, 1997 and U.S. Provisional Application No. 60/087,088, filed May 28, 1998.

BACKGROUND OF THE INVENTION

The present invention relates to blends of rubber modified monovinylidene aromatic polymers.

Rubber modified monovinylidene aromatic polymers, such as high impact polystyrene (HIPS), have found numerous applications which require high impact strength. One application wherein HIPS is typically used is food packaging products which specifically require good impact strength and transparent properties. Although toughness is achieved by HIPS resins, the transparency of thermoformed articles, such as thermoformed cups, is achieved using an expensive HIPS product having rubber particles with a specific capsule morphology.

Many attempts have been made to acquire the necessary balance of toughness and transparency in thermoformed articles using various materials and techniques. Transparent resins, such as polystyrene, polyethylene terephthalate and polypropylene have been used to produce transparent packaging via in-line thermoforming. However, in-line thermoforming processes require oversize extruders which run slower and are therefore less productive than conventional lines. Additionally, these polymers do not have the impact properties that rubber modified monovinylidene aromatic polymers can achieve. Alternatively, transparent packaging has been prepared by extruding and thermoforming blends of butadiene-styrene copolymer or styrene-butadiene-styrene copolymer with polystyrene. However, the copolymers are expensive and increase cost. Transparent packaging has also been made using optical grade general purpose polystyrene which is produced using tenter frames. However, such products can only be obtained to a maximum sheet thickness of 0.6 mm due to process constraints, which is not thick enough for some thermoforming applications. Polyvinylchloride has also been used to produce transparent packaging, but is thermally unstable and undesirable for food packaging.

Therefore, there remains a need for polymers which can produce cost effective transparent packaging, which can be used in food packaging and non-food packaging markets, and can be produced by conventional thermoforming lines.

SUMMARY OF THE INVENTION

The present invention is a blend of a monovinylidene aromatic polymer and a rubber modified monovinylidene aromatic polymer, which can be used to produce cost effective, transparent packaging that can be used in food packaging and non-food packaging markets, and can be produced using conventional thermoforming equipment. The blend comprises:

a) from 50 to 88 wt. percent based on the total weight of the blend, of a monovinylidene aromatic polymer having a weight average molecular weight (Mw) of from 265,000 to 400,000 and a melt flow of less than 2.5 g/10 min.; and b) from 12 to 50 wt. percent based on the total weight of the blend, of a rubber modified monovinylidene aromatic polymer comprising a monovinylidene aromatic polymer matrix having rubber particles dispersed therein, wherein the rubber particles comprise, based on the total weight of the rubber particles, from 25 to 100 weight percent rubber particles having a capsule morphology and a volume average particle size of from 0.1 to 0.4 microns; and from 75 to 0 weight percent rubber particles having an entanglement morphology having a volume average particle size of from 0.25 to 1 micron.

This blend can be used to produce a monolayer sheet or film, or as a core layer in a multilayer sheet or film. These blends offer significant impact resistance properties and economic benefit as well by using general monovinylidene aromatic polymers to partially replace the expensive rubber modified polymers which are typically used in such applications.

Another aspect of the present invention is a multilayer sheet or film comprising at least one layer of the blend of the present invention.

The blend of the present invention can be used to produce mono- or multilayer sheet or film using conventional extrusion, blow molding or blown film techniques. The sheet or film can be used to prepare transparent packaging materials which are cost effective and have good impact properties.

DESCRIPTION OF THE PREFERRED EMBODIMENTS

In one embodiment, the present invention is a blend of a monovinylidene aromatic polymer and a rubber modified monovinylidene aromatic polymer.

Monovinylidene aromatic polymers are produced by polymerizing vinyl aromatic monomers such as those described in U.S. Pat. Nos. 4,666,987, 4,572,819 and 4,585,825, which are herein incorporated by reference. Preferably, the vinyl aromatic monomer is of the formula:

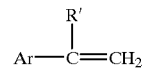

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof.

The monovinylidene aromatic polymers used in the blend of the present invention has a typical Mw of from 265,000 to 400,000 and a melt flow rate of less than 2.5 g/10 min. Typically the Mw is from 265,000, preferably from 270,000, more preferably from 275,000 and most preferably from 280,000 to 400,000, preferably to 375,000, more preferably to 350,000 and most preferably to 305,000. The melt flow rate is typically less than 2.5, preferably less than 2.3, more preferably less than 2.1, and most preferably less than 1.8 g/10 min.

The blend of the present invention also comprises a rubber modified monovinylidene aromatic polymer. Rubber modified monovinylidene aromatic polymers are produced by polymerizing vinyl aromatic monomers in the presence of a predissolved elastomer, examples of which are described in U.S. Pat. Nos. 3,123,655, 3,346,520, 3,639,522, and 4,409,369, which are incorporated by reference herein. In particular, a preferred rubber modified monovinylidene aromatic polymer used in the blends of the present invention and the method for making, is disclosed in U.S. Pat. No. 4,428,106 and U.S. Pat. No. 5,491,195, which are incorporated herein by reference.

Typically, the rubber modified monovinylidene aromatic polymer comprises from about 92 to about 55 weight percent based on the total weight of the polymer composition, of a monovinylidene aromatic polymer matrix and, dispersed within said matrix, from about 8 to about 45 weight percent of grafted and occluded 1,3-alkadiene-based rubber particles, said particles being composed, on a rubber particle weight basis, of:

from 25 to about 100 weight percent of rubber particles having a capsule morphology and a volume average particle size of from 0.1 to 0.4 micron.

Typically, the free (i.e., ungrafted) monovinylidene aromatic polymer matrix formed during polymerization will have a weight averaged molecular weight (Mw) of from about 130,000 to about 250,000 (preferably from about 150,000 to about 25 220,000); a number averaged molecular weight (Mn) from about 40,000 to about 100,000 (preferably from about 45,000 to about 75,000); and Mw:Mn ratio of from about 2 to about 5 (preferably from about 2.2 to about 3.5).

Rubber materials which are suitable for use in the rubber modified monovinylidene aromatic polymers of b) include rubbery 1,3-alkadiene polymers having a second order transition temperature of 0° C., or less, preferably −20° C. or less. Suitable rubbers include 1,3-alkadiene homopolymers and copolymers containing, in polymerized form and on a elastomeric polymer weight basis, from 60 to 100 percent of a 1,3-alkadiene monomer, such as butadiene, isoprene, and from 0 to 40 weight percent of one or more monoethylenically unsaturated comonomers such as styrene, acrylonitrile, alpha-methylstyrene, methacrylonitrile, methyl methacrylate, ethyl acrylate and the like. Preferred rubbers include 1,3-alkadiene/monovinylidene aromatic such as 1,3-butadiene/styrene block copolymer rubbers which contain from 60 to 85 weight percent of the 1,3-alkadiene monomer block copolymerized with from 15 to 40 weight percent of one or more monovinylidene aromatic monomers.

The typical rubber content of the rubber modified monovinylidene aromatic polymer of b) is from 5, preferably from 8, more preferably from 10 and most preferably from 12 to 30, preferably to 25, more preferably to 20 and most preferably to 18 weight percent, based on the total weight of the rubber modified monovinylidene aromatic polymer composition.

The dispersed, grafted and occluded rubber particles will typically have, per one part by weight of the raw material ungrafted rubber, from about 0.5 to about 4 or 5 (preferably from 1 or 1.5 to about 3 or 4) parts by weight of monovinylidene aromatic polymer grafted thereto and occluded therein. Accordingly, the total or combined weight of the grafted and occluded rubber particles (i.e., including polymerized, grafted and occluded monovinylidene aromatic polymer portions thereof) will typically constitute from about 10 to about 45 (preferably 15 or 20 to about 35, 40 or 45) weight percent of the overall rubber modified polymer composition with the remainder thereof (i.e., about 55 to about 90, preferably from about 55, 60 or 65 to about 75 or 80, weight percent) being free (i.e., non-grafted and non-occluded) matrix material.

In a preferred embodiment the rubber particles of the rubber modified monovinylidene aromatic polymer comprises:

i. from 25 to about 100 weight percent of rubber particles having a capsule morphology and a volume average particle size of from 0.1 to 0.4 micron; and ii. from about 75 to about 0 weight percent of rubber particles having an entanglement morphology and having a volume average particle size of from about 0.25 to 1 micron.

As used herein, the term capsule morphology refers to known small rubber particles that have a morphology which is commonly also referred to in the art as "single occlusion" or "core/shell" morphology. Similarly, the term "entanglement morphology" refers to various known non-cellular rubber particle morphologies that are commonly referred to tin the art as "entanglement", "labyrinth", "coil", "onion skin" or "concentric circle" morphology. The volume average particle size refers to the diameter of the rubber particles, including all occlusions of vinyl aromatic polymer within the rubber particles. Volume average particle sizes and distributions can be measured using conventional techniques such as a Coulter Counter™ or, transmission electron microscopy image analysis.

The rubber particles having capsule morphology will typically range in size from 0.05 micron to 1 micron with the overall volume averaged size taken over all capsule particles being from 0.1 to 0.4 micron. Preferably, the volume average particle size is from 0.2 to 0.35 micron. These particles typically constitute from 25 to 100, generally from 25 to 95, preferably from 25 to 80, more preferably from 25 to 65 and most preferably from 25 to 40 weight percent of the total weight of the rubber particles contained within the polymer matrix.

Entanglement morphology rubber particles can range from 0.2 to 3 microns and generally have a volume average particle size from 0.25 to 1 micron. Preferably such entanglement particles have a volume average particle size of from 0.3 or 0.35 to 0.8 micron. These particles typically constitute from 0 to 75, generally from 5 to 75, preferably from 20 to 75, more preferably from 35 to 75, and most preferably from 50 to 75 weight percent of the total weight of the rubber particles contained within the polymer matrix.

The rubber modified monovinylidene aromatic polymers used in the blend of the present invention can additionally contain other rubber particle sizes and morphologies, including cellular or multiple occlusion type morphologies. In another preferred embodiment, the rubber modified monovinylidene aromatic polymer will further comprise in addition to the capsule and entanglement morphology particles, from about 1 to about 25, preferably from 2 to 15 weight percent, based on the total weight of the particles, particles having a volume average particle size of 0.6 to 8 microns. Typically the volume average particle size is from 0.6, preferably from 0.8, more preferably from 1.0 and most preferably from 1.2 to 6, preferably to 6, more preferably to 2 and most preferably to 1.5 microns. These larger particles typically have a cellular or multiple occlusion type morphology. In a preferred embodiment, cellular particles are present having a volume average particle size of from 0.8 to 1 micron.

In a preferred embodiment, the blend comprises from 50 to 88 weight percent of monovinylidene aromatic polymer, preferably from 60, more preferably from 65, and most preferably from 70 to 88, preferably to 85, more preferably to 83, and most preferably to 80 wt. percent based on the total weight of the blend.

The blend of the present invention typically comprises from 12 to 50 wt. percent of rubber modified monovinylidene aromatic polymer, preferably from 15, more preferably from 18 and most preferably from 20 to 30, preferably to 35, more preferably to 40, and most preferably to 45 wt. percent based on the total weight of the blend.

Other additives may be included in the blend of the present invention such as mineral oil, other plasticizers and the like.

The blend is typically prepared by dry blending the polymers in the appropriated proportions prior to extrusion, although any method of blending can be utilized to produce extruded sheets.

The blend can be used in preparing a single layer sheet or film. In this embodiment, the blend will typically contain a high amount of monovinylidene aromatic polymer. Typically in such applications, the blend will contain from 50 to 80, preferably from 50 to 75, more preferably from 55 to 70, and most preferably from 60 to 65 weight percent of monovinylidene aromatic polymer based on the total weight of the blend. In cases where the blend undergoes in line thermoforming, the blend can contain much smaller amounts of high impact monovinylidene aromatic polymer, typically from 1 to 10 wt. percent.

In another aspect of the present invention the blend is used to prepare multilayer sheets or films. In a preferred embodiment, the multilayer sheet or film comprises a core or middle layer of the blend of the present invention, and an outer or capping layer located on each side of the core or middle layer of a blend (blend II) comprising a) from 0 to 80 wt. percent based on the total weight of the blend, of a monovinylidene aromatic polymer having a weight average molecular weight (Mw) of from 150,000 to 250,000 and a melt flow of at least 10 g/10 min.; and b) from 20 to 100 wt. percent based on the total weight of the blend, of a rubber modified monovinylidene aromatic polymer comprising a monovinylidene aromatic polymer matrix having rubber particles dispersed therein, wherein the rubber particles comprise, based on the total weight of the rubber particles from 25 to 95 weight percent rubber particles having a capsule morphology and a volume average particle size of from 0.1 to 0.4 microns and from 75 to 5 weight percent rubber particles having an entanglement morphology having a volume average particle size of from 0.25 to 1 micron;

wherein the outer capping layers each comprise from about 5 to about 10 percent of the total thickness of the multilayer sheet or film. Alternatively, other polymers can be used as outer capping layers including other monovinylidene aromatic polymers and rubber modified monovinylidene aromatic polymers.

Surprisingly, thermoformed articles prepared from the above multilayer sheet or film, such as cups, perform extremely well in taste and odor tests when compared to other commercially used resins such as amorphous polyethylene terephthalate, polypropylene and K-resin blends.

The multilayer sheet or film can be produced using known techniques in the art such as multilayer extrusion and blow molding.

Multilayer sheet thicknesses are typically from 0.2 to 1.6 millimeters (mm) preferably from 0.3, more preferably from 0.4, and most preferably from 0.5 to 1.5, preferably to 1.0, more preferably to 0.95, and most preferably to 0.90 mm. Multilayer sheets can be further processed by thermoforming into articles which have good impact strength and transparency. Thicknesses of less than 0.2 mm can also be achieved and used in applications where thin gauge materials are desired, such as transparent lids.

Film thicknesses are typically from 0.012 to 0.06 mm, preferably from 0.018 more preferably from 0.020 and most preferably from 0.023 to 0.05, preferably to 0.04, more preferably to 0.03 and most preferably to 0.025 mm.

The thickness of the multilayer sheets and films is typically comprised of from 70 to 95 percent, based on the total thickness of the sheet or film, of a core layer of the blend of the present invention, preferably from 75, more preferably from 80 and most preferably from 85 to 95, preferably to 94, more preferably to 92 and most preferably to 90 percent; and from 5 to 20 percent, based on the total thickness of the sheet or film of at least one outer layer of blend II, preferably from 10, more preferably from 8 and most preferably from 6 to 20, preferably to 18, more preferably to 15 and most preferably to 12 percent. In embodiments wherein blend II is used as two outer layers in a three layer structure, the thickness defined above is a combined thickness of the blend II layers.

In another embodiment of the present invention the blend of the present invention is used in a multilayer sheet which also comprises layers of a high or low density polyolefin, an adhesion modified polyolefin, and ethylene vinyl alcohol. Preferably the multilayer sheet is a seven layer sheet having the following layers, a high or low density polyolefin/an adhesion modified polyolefin/the blend of the first aspect of the present invention/an adhesion modified polyolefin/ethylene vinyl alcohol/an adhesion modified polyolefin/the blend of the first aspect of the present invention, in the stated order. In this embodiment the high or low density polyolefin is preferably a low density polyethylene having a density of less than 0.924 g/cm3. This layer is typically from about 0.0425 to 0.30 mm thick, preferably from about 0.10 to 0.15 mm and is from about 5 to 20 percent, preferably from about 12 to 18 percent of the total multilayer sheet thickness. The adhesion modified polyolefin is a polyolefin such as polyethylene or polypropylene, which has been modified with functional groups such as vinyl acetate, butyl acetate, maleic anhydride or acrylic acid to promote adhesion. Preferably, the adhesion modified polyolefin is Admer™, available from Mitsui Petrochemical. This layer is typically from about 0.025 to 0.075 mm thick, preferably from about 0.030 to about 0.040 mm and is from about 3 to 5 percent of the total multilayer sheet thickness. The blend of the first aspect of the present invention is as described previously and is preferably a 50/50 blend by weight of the monovinylidene aromatic polymer and rubber modified monovinylidene aromatic polymer. This layer is typically from about 0.2125 to 0.34 mm thick, preferably from about 0.25 to about 0.30 mm, and is from about 25 to about 40 percent, preferably from about 30 to about 35 percent of the total multilayer sheet thickness. The ethylene vinyl alcohol copolymer layer serves as a barrier against the permeability to oxygen and is typically a copolymer containing from about 32 to 38 percent of an ethylene component and from about 62 to 68 percent by weight of a vinyl alcohol component. Polyamides and polyvinylidene chlorides can also be used as the barrier polymer. This layer is typically from about 0.05 to 0.225 mm, preferably from about 0.08 to about 0.15 mm thick and from about 6 to 15 percent, preferably from about 10 to 12 percent of the total multilayer sheet thickness. The multilayer sheet of this embodiment is typically from about 0.85 to about 1.5 mm thick, however thinner sheets can be produced for applications of smaller packages or applications requiring less demanding barriers.

The multilayer sheets can be produced by the flat die/calendering coextrusion process. This sheet can then be thermoformed by standard plug and mold thermoforming machines to make preformed containers, or by form-fill-seal lines. This multilayer sheet can be used to produce form-fill-seal packaging having good transparency, barrier and toughness properties, as well as preformed packages or containers by standard thermoforming equipment.

A preferred embodiment of the present invention is a trilayer sheet or film comprising a core or middle layer of the blend of the first aspect of the present invention and two outer capping layers of blend II, as recited previously, located on each side of the core or middle layer, wherein the outer layers comprise a total thickness of up to 20, preferably up to 15 and most preferably up to 10 percent of the total thickness of the trilayer sheet or film and the core or middle layer comprises a total thickness of at least 80, preferably 85 and most preferably 90 percent of the total thickness of the trilayer sheet or film.

The multilayer sheets of the present invention are typically thermoformed at high speeds using well known techniques such that the polymers are oriented and the thermoformed articles exhibit transparent properties. The thermoforming temperature is typically below 144° C. and is preferably between 138 and 142° C., while the drawing speed (strain rate) is generally above 250 mm/second, and is preferably between 285 and 295 mm/second. The sheet typically has haze values of 30 to 40 percent prior to thermoforming with haze values of 2 to 4 percent once thermoforming is complete. Haze values are determined by using ASTM test method D-1003.

Thermoformed articles prepared using this process are surprisingly transparent when the draw down ratio of the article is at least 0.4. The draw down ratio is the ratio of the height of the article to the diameter of the cross sectional area. The draw down ratio is typically 0.4 to 1.5, preferably 0.4 to 1.2 and most preferably 0.5 to 1.2.

The following examples are provided to illustrate the present invention. The examples are not intended to limit the scope of the present invention and they should not be so interpreted. Amounts are in weight parts or weight percentages unless otherwise indicated.

EXAMPLE 1

Polystyrene (80 kg) having a Mw of 315,000 and a melt flow rate of 1.5 g/10 min. is blended with a rubber modified polystyrene (AIM™ 4950) (20 kg) at room temperature to prepare the blend of the present invention (I). Polystyrene (4 kg) having a Mw of 205,000 and a melt flow rate of 15 g/10 min. is blended with a rubber modified polystyrene (AIM™ 4950) (6 kg) to prepare a second blend (II). The blends are coextruded, blend I at 210° C. melt temperature and blend II at 200° C. melt temperature such that blend I forms a core layer and blend II is a capping layer on either side of the core layer. The core layer is 0.72 mm thick while the capping layers are 0.04 mm each.

The multilayer coextruded sheet is then thermoformed to produce articles having excellent transparency and impact properties.

TABLE I

| | Multilayer Sheet | Thermoformed Article |
|---|---|---|
| Average Thickness | 0.81 mm | 0.18 mm |
| Haze | 33.8% | 3.0% |

EXAMPLE 2

Sheets of the materials listed in Table II are thermoformed into cups under the same conditions using the same equipment. The cups are filled with 400 mL of potable tap water. The cups are covered with aluminum foil and stored for 10 days at 40° C. in a dark air heated cabinet. One liter bottles of potable water are stored under identical conditions to be used as a control.

TABLE II

| SAMPLE | |
|---|---|
| 1* | Amorphous Polyethylene Terephthalate 9921 |
| 2* | Polypropylene 6823 |
| 3* | 60% K-resin (KRO3) and 40% STYRON ™ 615APR blend |
| 4 | AIM ™/GPPS blend (trilayer coextruded sheet) 6 vol. % Blend II (30 wt. % AIM ™ 4950 and 70 wt. % STYRON ™ 615APR 88 vol. % of Blend I (20 wt. % AIM ™ 4950 and 80 wt. % STYRON ™ 685D 6% vol. % Blend II |

*Comparative Examples

Amorphous Polyethylene Terephthalate 9921 is a product of Eastman
Chemical Products, Inc.
Polypropylene 6823 is a product of Montell.
K-resin(KRO3) is a product of Phillips Chemical Company
STYRON™ 615APR is a product of The Dow Chemical Company.
AIM™ 4950 is a product of The Dow Chemical Company
STYRON™ 685D is a product of The Dow Chemical Company Approximately 40 mL of the exposed water is placed in a test cup and covered by a watch glass. A volunteer panel of 13 tasters is used to evaluate the samples. The samples are placed in 4 series wherein the positions of the samples are completely randomized in each series. The series comprise:
I All four sample without a water control sample
II Samples 1, 2, 4 and water control
III Samples 2, 3, 4 and water control
IV Samples 1, 3, 4 and water control
Rating Test on Odor
  The panel members are requested to judge the samples, offered in random order, using the following rating scale:
  0=no smell
  1=hardly perceptible smell
  2=slightly perceptible smell
  3=perceptible smell
  4=strong smell
  5=very strong smell
Ranking on Odor
  The panel members are requested to judge the samples, offered in random order, using the following ranking scale:
  1=strongest smell
  2= . . .
  3= . . .
  4=slightest or no smell
Rating Test on Taste
  The panel members are requested to judge the samples, offered in random order, using the following rating scale:
  0=no taste (=reference)
  1=very weak taste
  2=weak taste
  3=taste
  4=strong taste
  5=very strong taste
Ranking on Taste
  The panel members are requested to judge the samples, offered in random order, using the following ranking scale:

1=strongest taste
2= . . .
3= . . .
4=weakest taste

Calculation procedure of the Rating/Ranking Test

Volunteers are used as panel members in evaluating the taste and odor of each sample. Individual scores of panelists which do not meet the criteria with respect to the minimum requirements of individual scores in the ranking test versus the mean ranking results and, if applicable, recognition of reference water in the rating test are omitted. The individual scores of the panel members are used to calculate a mean rating and the sum of ranks for each sample.

Results

TABLE III

Series 1: Rating/ranking test on odor

| Sample | 1* | 2* | 3* | 4 |
|---|---|---|---|---|
| Rating | 0.85 | 2.54 | 3.62 | 1.0 |
| Ranking | 45 | 24 | 17 | 44 |

Number of panel members used in the test: 13
Number of panel members omitted: 2

Conclusions

In the rating test no significant difference is observed between water exposed to APET 9921 and AIM/GPPS. This is confirmed in the ranking test.

TABLE IV

Series 1: Rating/ranking test on taste

| Sample | 1* | 2* | 3* | 4 |
|---|---|---|---|---|
| Rating | 0.64 | 2.86 | 3.79 | 0.64 |
| Ranking | 51 | 26 | 16 | 47 |

Number of panel members used in the test: 14
Number of panel members omitted: 1

Conclusions

In the rating test no significant difference has been observed between water exposed to APET 9921 and AIM/GPPS. This is confirmed in the ranking test.

TABLE V

Series 2: Rating/ranking test on odor

| Sample | Control | 1* | 2* | 4 |
|---|---|---|---|---|
| Rating | 0.41 | 0.59 | 3.00 | 0.41 |
| Ranking | 53 | 46 | 17 | 54 |

Number of panel members used in the test: 17
Number of panel members omitted: 3

Conclusions

In the rating test no significant difference has been observed between the water control and AIM/GPPS. This is confirmed in the ranking test.

TABLE VI

Series 2: Rating/ranking test on taste

| Sample | Control | 1* | 2* | 4 |
|---|---|---|---|---|
| Rating | 0.38 | 0.69 | 2.50 | 0.75 |
| Ranking | 54 | 43 | 17 | 46 |

Number of panel members used in the test: 16
Number of panel members omitted: 4

Conclusions

In the rating test no significant difference has been observed between water exposed to APET 9921 and AIM/GPPS. This is confirmed in the ranking test and only a very small difference is observed between these two and the water control.

TABLE VII

Series 3: Rating/ranking test on odor

| Sample | Control | 2* | 3* | 4 |
|---|---|---|---|---|
| Rating | 0.58 | 0.68 | 3.11 | 0.68 |
| Ranking | 58 | 57 | 19 | 56 |

Number of panel members used in the test: 19
Number of panel members omitted: 1

Conclusions

In the rating test no significant difference has been observed between water exposed to APET 9921 and AIM/GPPS. This is confirmed in the ranking test and only a very minor difference is observed between these two and the control water.

TABLE VIII

Series 3: Rating/ranking test on taste

| Sample | Control | 2* | 3* | 4 |
|---|---|---|---|---|
| Rating | 0.39 | 0.50 | 3.33 | 0.61 |
| Ranking | 53 | 54 | 19 | 54 |

Number of panel members used in the test: 18
Number of panel members omitted : 2

Conclusions

In the rating test no significant difference has been observed between water exposed to APET 9921 and AIM/GPPS. This is confirmed in the ranking test.

TABLE IX

Series 4: Rating/ranking test on odor

| Sample | Control | 1* | 3* | 4 |
|---|---|---|---|---|
| rating | 0.47 | 2.47 | 3.05 | 0.58 |
| ranking | 67 | 34 | 24 | 65 |

Number of panel members used in the test: 19
Number of panel members omitted: 1

Conclusions

In the rating test no significant difference has been observed between water control and AIM/GPPS. This is confirmed in the ranking test.

TABLE X

Series 4: Rating/ranking test on taste

| Sample | Control | 1* | 3* | 4 |
|---|---|---|---|---|
| rating | 0.35 | 2.41 | 3.41 | 0.76 |
| ranking | 63 | 32 | 19 | 56 |

Number of panel members used in the test: 17
Number of panel members omitted: 3
Conclusions In the rating test no significant difference has been observed between water control and AIM/GPPS. This is confirmed in the ranking test.

Therefore, it is clear that the AIM/GPPS blends will perform equally, if not better than Polyethylene terephthalate which is currently used in the current thermoformed cup market and performed very close to the water control in all the taste and odor tests.

What is claimed is:

1. A polymer blend comprising:
    a) from 50 to 88 wt. percent based on the total weight of the blend, of a monovinylidene aromatic polymer having a weight average molecular weight (Mw) of from 265,000 to 400,000 and a melt flow of less than 2.5 g/10 min.; and
    b) from 12 to 50 wt. percent based on the total weight of the blend, of a rubber modified monovinylidene aromatic polymer comprising a monovinylidene aromatic polymer matrix having rubber particles dispersed therein, wherein the rubber particles comprise, based on the total weight of the rubber particles, from 25 to 100 weight percent rubber particles having a capsule morphology and a volume average particle size of from 0.1 to 0.4 microns.

2. The blend of claim 1 wherein the monovinylidene aromatic polymer of a) is polystyrene.

3. The blend of claim 1 wherein the rubber modified monovinylidene aromatic polymer further comprises up to 75 weight percent, based on the total weight of the rubber particles, rubber particles having an entanglement morphology and a volume average particle size of from 0.25 to 1 micron.

4. The blend of claim 3 wherein the rubber modified monovinylidene aromatic polymer further comprises from 1 to 25 weight percent, based on the total weight of the rubber particles, rubber particles having a cellular morphology and a volume average particle size of from 0.6 to 8 micron.

5. The blend of claim 1 wherein the monovinylidene aromatic polymer of a) has a Mw of from 286,000 to 305,000 and a melt flow rate of from 1 to 2.5 g/10 min.

6. The blend of claim 1 wherein the monovinylidene aromatic polymer of a) is from 70 to 80 wt. percent and the rubber modified monovinylidene aromatic polymer of b) is from 20 to 30 wt. percent, based on the total weight of the blend.

7. A multilayer sheet or film comprising at least one layer of the blend of claim 1 and at least one layer of a blend II comprising:
    a) from 0 to 80 wt. percent based on the total weight of the blend, of a monovinylidene aromatic polymer having a weight average molecular weight (Mw) of from 150,000 to 250,000 and a melt flow of at least 10 g/10 min.; and
    b) from 20 to 100 wt. percent based on the total weight of the blend, of a rubber modified monovinylidene aromatic polymer comprising a monovinylidene aromatic polymer matrix having rubber particles dispersed therein, wherein the rubber particles comprise, based on the total weight of the rubber particles from 25 to 100 weight percent rubber particles having a capsule morphology and a volume average particle size of from 0.1 to 0.4 microns.

8. The multilayer sheet or film of claim 7 comprising a core layer of the blend of claim 1, and two outer capping layers of blend II, wherein the capping layers are each from 5 to 10 percent of the total thickness of the multilayer sheet or film.

9. The multilayer sheet of claim 7 having a total thickness of from 0.2 to 1.6 mm.

10. The multilayer film of claim 7 having a total thickness of from 0.012 to 0.06 mm.

11. A sheet or film produced from the blend of claim 1.

12. Thermoformed articles produced by thermoforming a sheet comprising the blend of claim 1, at a temperature below 144° C. and a drawing speed above 250 mm/second.

13. The thermoformed articles of claim 12, wherein the draw down ratio is at least 0.4.

* * * * *